United States Patent
Davis et al.

(10) Patent No.: US 6,173,695 B1
(45) Date of Patent: Jan. 16, 2001

(54) CYLINDER HEAD WITH HIGH SWIRL INTAKE PORT AND COMBUSTION CHAMBER

(76) Inventors: Gregory G. Davis, 4059 Hillside Ave., Norco, CA (US) 92680; Kenneth R. Thurm, 2348 N. Rockridge Cir., Orange, CA (US) 92867

( * ) Notice: Under 35 U.S.C. 154(b), the term of this patent shall be extended for 0 days.

(21) Appl. No.: 09/286,976

(22) Filed: Apr. 6, 1999

(51) Int. Cl.[7] .................................................... F02B 31/04
(52) U.S. Cl. ........................................... 123/306; 123/309
(58) Field of Search .................................... 123/298, 301, 123/306, 309, 188.14

(56) References Cited

U.S. PATENT DOCUMENTS

| | | | | |
|---|---|---|---|---|
| 3,933,142 | * | 1/1976 | List et al. .......................... | 123/188.14 |
| 4,421,080 | * | 12/1983 | Kogure et al. ....................... | 123/306 |
| 4,606,308 | * | 8/1986 | Furlong ................................ | 123/306 |
| 4,686,948 | * | 8/1987 | Smith, Jr. et al. .................... | 123/306 |
| 5,474,044 | * | 12/1995 | Matterazzo et al. .................. | 123/306 |
| 5,558,061 | * | 9/1996 | Suminski ............................. | 123/306 |
| 5,598,820 | * | 2/1997 | Sokoloski ............................ | 123/306 |
| 5,816,210 | * | 10/1998 | Yamaguchi ..................... | 123/188.14 |
| 5,913,554 | * | 6/1999 | Oda et al. ............................ | 123/306 |
| 5,950,582 | * | 9/1999 | Stein ................................... | 123/306 |

FOREIGN PATENT DOCUMENTS 52-77907  *  6/1977  (JP) ..................................... 123/309

\* cited by examiner

*Primary Examiner*—Erick Solis
(74) *Attorney, Agent, or Firm*—Setina Brunda Garred & Brucker; Kit M. Stetina

(57) ABSTRACT

A cylinder head for a four-cycle internal combustion engine with improved intake port and combustion chamber configuration. The physical shape of the intake port and combustion chamber directs the flow of the incoming air/fuel mixture in a swirl path, which is directed toward the spark plug. In particular, the intake port has a fin at its terminal opening into the combustion chamber. The fin creates a swirling motion in the incoming gasses and also directs the flow of the gasses toward the spark plug. As a result, a greater percentage of the intake charge is in close proximity to the center of the combustion chamber and the spark plug, and hence combustion occurs faster and more completely.

In a preferred embodiment of the invention, the portion of the cylinder head that forms the upper surface of the combustion chamber, includes a shear ledge that further acts to direct the flow of the incoming gasses toward the sparkplug. The shear ledge acts as a secondary boundary for the gasses that go past the intake port fin, directing that portion of the charge that goes past the intake port fin toward the center of the cylinder and closer to the spark plug. As a result, the engine runs more efficiently, has cleaner exhaust emissions, runs at lower temperatures and has increased torque and horsepower.

24 Claims, 2 Drawing Sheets

CYLINDER HEAD WITH HIGH SWIRL INTAKE PORT AND COMBUSTION CHAMBER

FIELD OF THE INVENTION

The present invention relates to the field of cylinder heads for four-cycle internal combustion engines, and more particularly to a cylinder bead having a combustion chamber and intake port with deflecting features for improving combustion efficiency.

BACKGROUND OF THE INVENTION

Internal combustion engines generate power by igniting a mixture of fuel and air. In order to get the most power from the fuel, that is, for the most efficient operation, many factors involved in the combustion process must be optimized. These factors include the shapes of both the intake port and the combustion chamber, which determines the flow path of the intake charge before and after it enters the combustion. The manner in which the intake charge flows will affect speed of combustion and the percentage of the charge that is ignited during combustion.

Much research has gone into finding ways to increase engine efficiency by varying the shape of these features. Resulting improvements in combustion efficiency have yielded many benefits including cleaner exhaust emissions, improved fuel economy, lower engine running temperatures, increased torque, and increased horsepower.

There is clearly still a need for further improvements. For example, air pollution continues to be a serious problem, so it is desirable to continue to lessen harmful exhaust emissions. Improving fuel economy is important, particularly in achieving the goal of reducing the reliance on fossil fuels. Thus, it would be desirable to provide additional improvements in combustion efficiency by developing further improvements in intake port and combustion chamber design.

SUMMARY OF THE INVENTION

A cylinder bead for a four-cycle internal combustion engine with improved intake port and combustion chamber configurations. In the present invention the physical shape of the intake port and combustion chamber directs the flow of the incoming air/fuel mixture in a swirl path, which is directed toward the spark plug. In particular, the intake port has a protruding fin at its terminal opening into the combustion chamber. The fin creates a swirling motion in the incoming gasses and also directs the flow of the gasses toward the spark plug. As a result, a greater percentage of the intake charge is in close proximity to the center of the combustion chamber and the spark plug, and hence combustion occurs faster and more completely.

In a preferred embodiment of the invention, the portion of the cylinder head that forms the upper surface of the combustion chamber, includes a shear ledge that further acts to direct the flow of the incoming gasses toward the sparkplug. The shear ledge acts as a secondary boundary for the gasses that go past the intake port fin, directing that portion of the charge toward the center of the cylinder and closer to the spark plug. By concentrating the intake charge toward the center of the cylinder, the intake charge is ignited more completely and more rapidly. This is because the majority of the fresh intake charge is kept from directly contacting the cylinder wall by the shear ledge working in conjunction with a flat, shallow combustion chamber geometry. The swirl induction increases combustion efficiency, while the chamber geometry of the invention increases combustion speed. As a result, the engine runs more efficiently, has cleaner exhaust emissions, runs at lower temperatures and has increased torque and horsepower.

DETAILED DESCRIPTION OF THE DRAWINGS

The present invention is an improved cylinder head for an internal combustion engine. In a preferred embodiment of the invention, the inventive concepts will be applied to a two cylinder, four-cycle, 45 degree V-Twin motorcycle engine. While this embodiment is used herein to illustrate the invention, it will be appreciated that many other configurations and types of internal combustion engines may also benefit by incorporating the teachings of the invention. For example, the invention may be applied to engines other than motorcycle engines and to engines having different numbers of cylinders. By using the teachings of the present invention, adapting the cylinder head of the preferred embodiment to other types of engines will be within the ordinary abilities of one skilled in the art.

Figure 1:
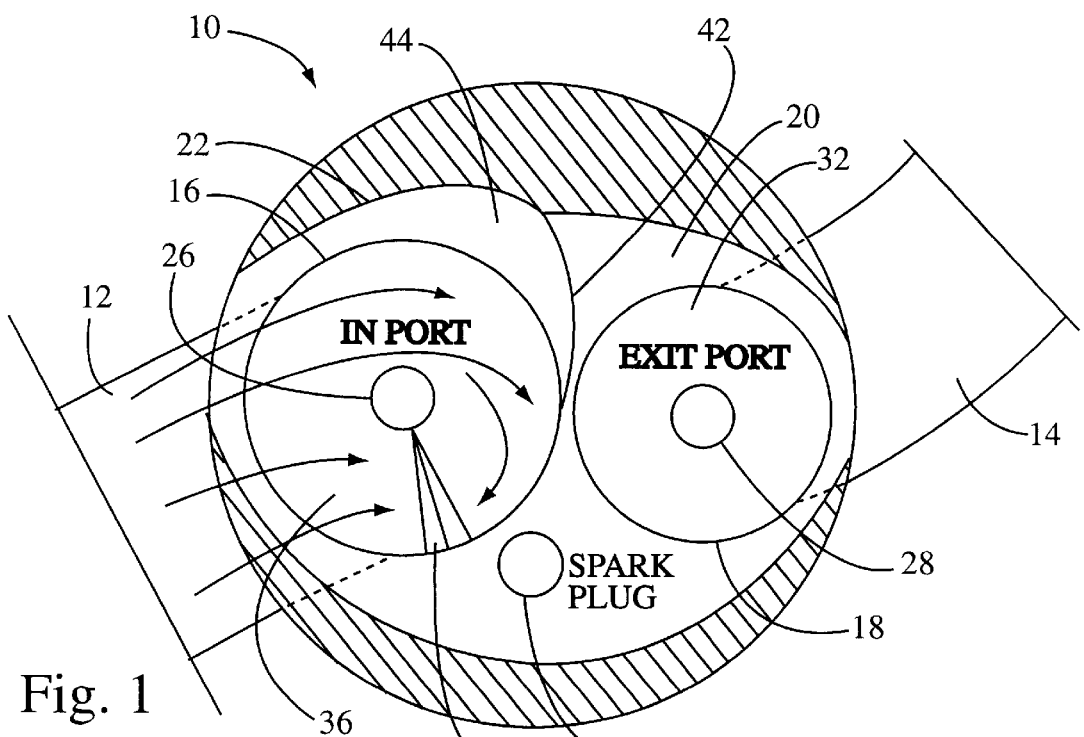
FIG. 1 shows a diagram of the lower portion of a cylinder head including the intake and exhaust ports and the combustion chamber in accordance with a preferred embodiment of the invention.
Figure 2:
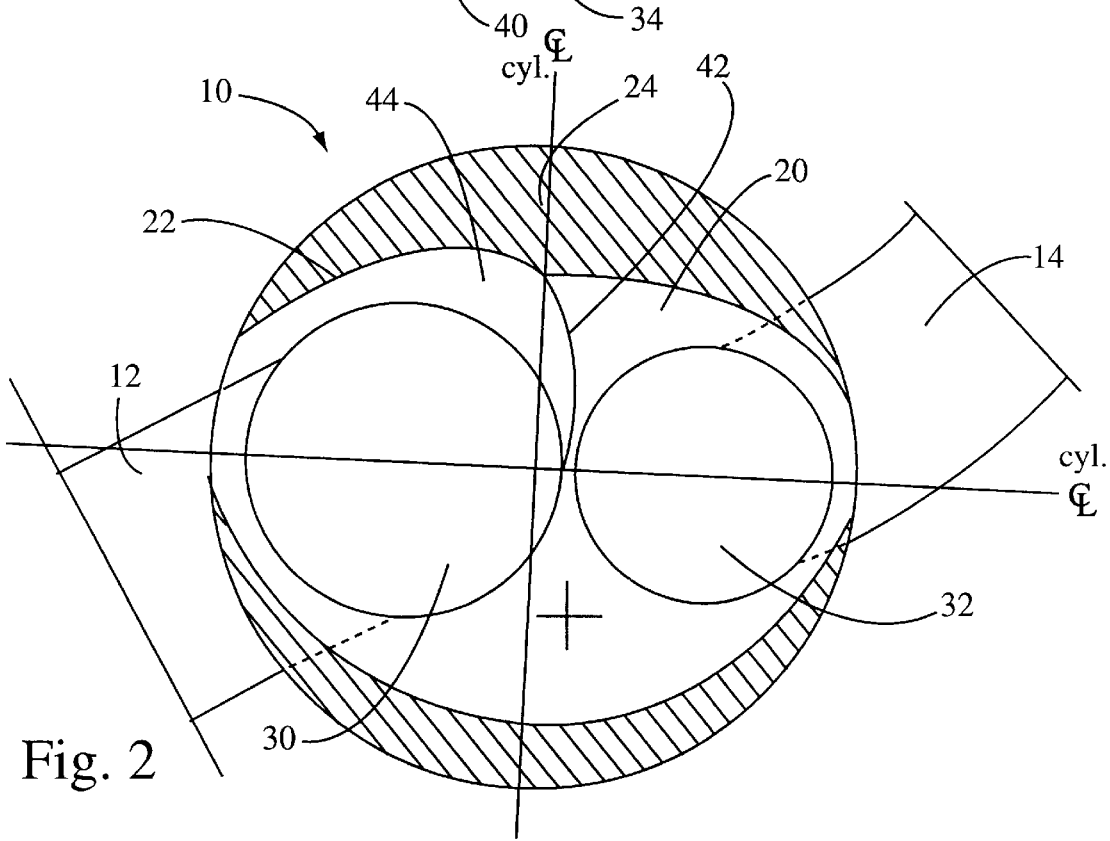
FIG. 2 shows another view of the cylinder head shown in FIG. 1.

Referring to FIG. 1, there is shown a portion of a cylinder head 10 for a two-cylinder motorcycle engine in accordance with the present invention. The cylinder head 10 includes an intake port 12 and an exhaust port 14. The intake and exhaust ports terminate at openings 16 and 18 in an upper surface 20 of a combustion chamber 22. As shown in FIG. 2, the cylinder head 10 includes a flat lower mating surface 24 that is mounted in contact with the top surface of an engine block(not shown). The combustion chamber upper surface 20 is recessed from the mating surface 24 to create the combustion chamber 22. Immediately below the combustion chamber upper surface 20 is the cylinder bore (not shown) of the engine block which contains a piston (not shown) that forms the lower surface of the combustion chamber.

Both the intake 12 and exhaust 14 ports include openings for valve guides 26 and 28 which carry the stem of the intake valve 30 and the exhaust valve 32. An opening 34 in the combustion chamber upper surface 20 is configured to receive a spark plug (not shown). The intake port 12 is generally circular in cross-section (but, could be square or rectangular depending on the physical constraints of the application) with a curved portion 36 that directs the intake gasses downward into the opening 16 that leads into the combustion chamber 22. While the curved portion 36 directs the gasses downwardly into the combustion chamber 22, these gasses will still have momentum that causes them to continue in a direction along the longitudinal axis of the intake port 12. Consequently, a substantial portion of the intake gasses will be directed into the wall of the combustion chamber opposite the intake port opening 16. This is undesirable because the fresh gasses near the cylinder wall not ignite as quickly or completely as those near the center of the combustion chamber. This is because there is a termination of the combustion process just prior to the bum front at the cylinder wall. Therefore it is desirable to keep the fresh charge away from the cylinder wall.

The cylinder head 10 of the present invention minimizes this effect by directing the intake gasses toward the center of the combustion chamber and away from the sides. Some of the gasses are also directed toward the spark plug where they will ignite more rapidly and more completely. This is accomplished in two ways. First, the intake port 12 is configured with a fin 40 that projects downward toward the combustion chamber. Second, the combustion chamber 22 contains a shear ledge 42.

In the preferred embodiment, the fin 40 begins at the intake valve guide 26 in the roof of the port and ends at the intake port opening 16 near the valve seat. The longitudinal axis of the fin 40 points in the general direction of the spark plug opening 34. By directing the intake gasses toward the spark plug, the combustion process is improved by the fin 40 because of the greater proximity of the gasses to the spark plug that ignites them. Another reason for this improvement is that the gasses will be closer to the center of the combustion chamber and away from the edges. In addition, the fin 40 creates a swirling motion in the intake gasses. This swirling motion has the effect of generating a much more even air/fuel atomization, which creates a more even and therefore more complete combustion.

The fin 40 permits the combustion process to be fine-tuned by altering the orientation of the fin. In the foregoing discussion the fin 40 was described as having its axis pointing toward the spark plug. However, if the axis of the fin is turned away from the spark plug and toward the exhaust valve, engine performance is affected. The present inventors have found that the orientation of the axis of the fin 40 can be modified about 15 degrees toward or away from the sparkplug to vary the performance characteristics of the engine. For example, it has been found that the RPM and peak torque are affected by the orientation of the fin 40. In particular, if the fin 40 is pointed toward the exhaust valve, optimum operating RPM is increased. If the fin is clocked past the sparkplug clockwise, optimum RPM is decreased, that is, optimum power will be in the lower RPM range. This effect has been observed in experimental tests.

To further improve the combustion processes, the present invention incorporates a shear ledge 42 into the upper surface of the combustion chamber 20. The shear ledge 42 begins at the edge of the combustion chamber and continues to a point near the center of the combustion chamber. The shear ledge 42 controls the movement of those intake gasses that were not deflected by the fin 40, by directing them toward the center of the combustion chamber. Thus, the shear ledge 42 further enhances the effects and advantages achieved by the fin 40; that is, directs the intake gasses away from the cylinder walls and toward the center of the chamber and towards the spark plug. The result is improved combustion efficiency.

While the greatest improvements in combustion efficiency are found by using both the fin 40 and shear ledge 42 together, each one by itself will achieve some of the same advantages. These advantages include cleaner exhaust emissions, lower engine running temperatures, and increased torque and horsepower.

Figure 3:
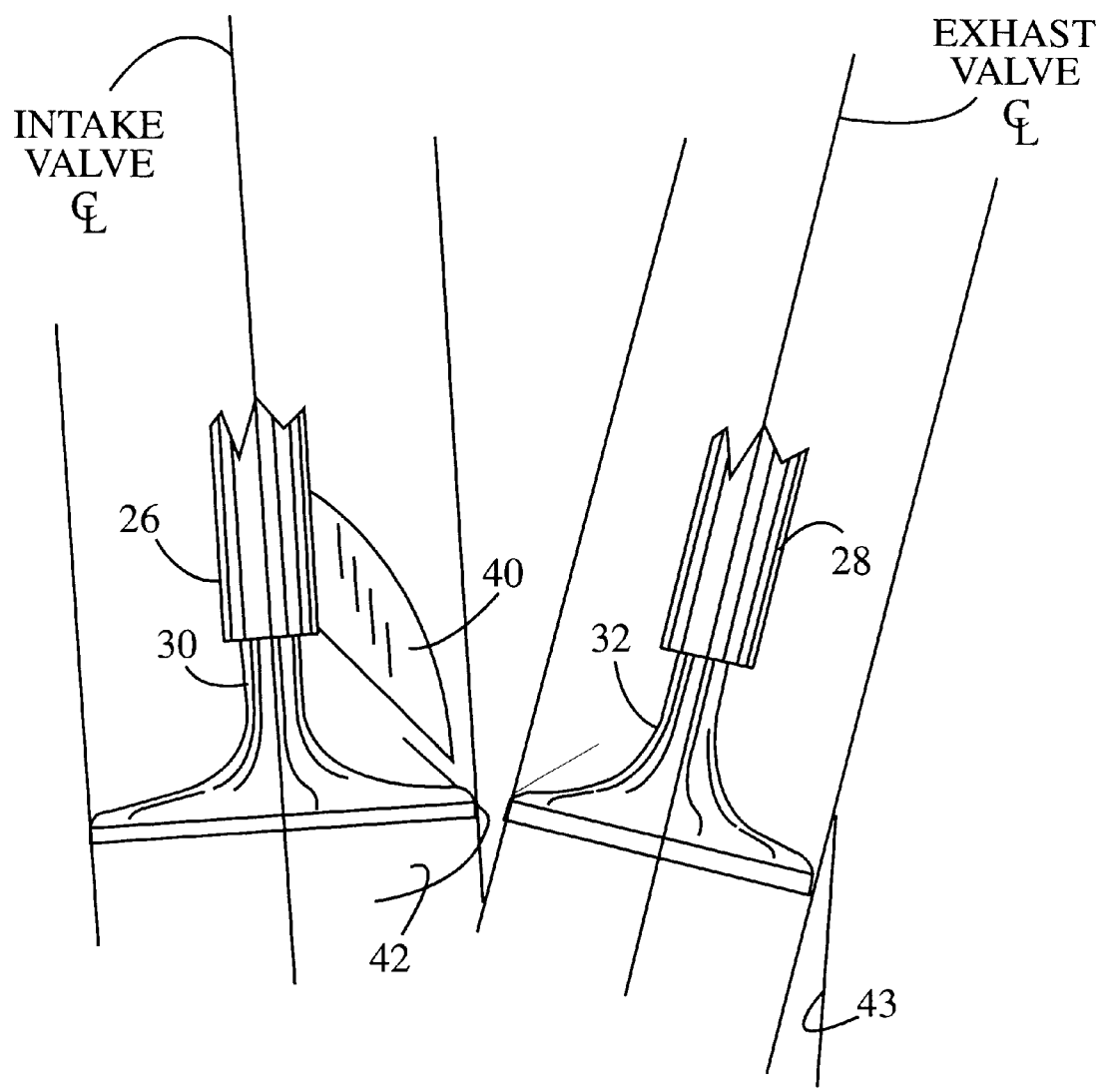
FIG. 3 is a cross-sectional side view of the cylinder head shown in FIG. 1.

FIG. 3 shows a side view of the arrangement of the valves 30 and 32. The cylinder wall 43 is also visible in this Figure. In the preferred embodiment of the invention, the combustion chamber upper surface 20 is generally flat. In particular, as much of the combustion chamber surface as possible is a flat planar surface. One exception is an inclined portion 44 immediately adjacent to the shear ledge 42, which is a slightly inclined planar surface formed to create the shear ledge 42.

Numerous modifications to and alternative embodiments of the present invention will be apparent to those skilled in the art in view of the foregoing description. For example, the exact dimensions and shapes of the fin 40 and shear ledge 42 may be modified to optimize the operation for any given engine design. In addition, some of the advantages of the invention may be achieved by using only the fin 40 or only the shear ledge 42.

Accordingly, this description is to be construed as illustrative only and is for the purpose of teaching those skilled in the art the best mode of carrying out the invention. Details of the structure and method may be varied substantially without departing from the spirit of the invention and the exclusive use of all the modifications, which come within the scope of the appended claims, is reserved.

What is claimed is:

1. A cylinder head for an internal combustion engine comprising:

a flat cylinder head bottom surface adapted to be mounted adjacent to the top surface of an engine block;

a generally circular portion recessed from the cylinder head bottom surface, the recessed portion forming the top surface of a combustion chamber;

intake and exhaust openings in the top surface of the combustion chamber;

intake port disposed within the cylinder head having a first open end for receiving an intake charge, and including a second opening forming the intake opening in the top surface of the combustion chamber;

an elongated fin protruding downwardly from the upper surface of the intake port above the intake opening;

a spark plug opening on the top surface of the combustion chamber; and said fin being disposed such that the longitudinal axis of the fin is directed generally in a direction towards the spark plug opening, whereby substantially all intake gasses passing through the intake port and into the combustion chamber are at least partially deflected unidirectionally by the fin toward the direction of the spark plug opening.

2. A cylinder head according to claim 1 further comprising a recessed portion in the combustion chamber top surface, the edge of the recessed portion being disposed generally perpendicular to the longitudinal axis of the intake port and disposed in a direction generally along a line leading toward the spark plug opening, whereby substantially all intake gasses are at least partially deflected unidirectionally by said edge toward the spark plug opening.

3. A cylinder head according to claim 2 wherein the recessed portion edge is disposed partially between the intake and exhaust openings.

4. A cylinder head according to claim 2 wherein the recessed portion edge is curved.

5. A cylinder head according to claim 2 wherein the recessed portion edge has one end adjacent to the edge of the combustion chamber top surface and the other end is disposed at a point between the intake and exhaust openings.

6. A cylinder head according to claim 1 wherein the top surface of the combustion chamber is generally flat.

7. A cylinder head according to claim 1 wherein the fin has one end disposed over the center of the intake opening and the other end adjacent to edge of the intake opening.

8. A cylinder head according to claim 1 wherein the fin has a longitudinal axis that is offset from the spark plug opening.

9. A cylinder head according to claim 8 wherein the fin longitudinal axis is offset from the spark plug opening by plus or minus 15 degrees.

10. An intake port for an intake combustion engine comprising:
   intake port disposed within the cylinder head having a first open end for receiving an intake charge, and having a second opening forming the intake opening in the top surface of a combustion chamber;
   an elongated fin protruding downwardly from an upper surface of the intake port above the second opening;
   said fin being disposed such that the longitudinal axis of the fin is directed generally in a direction towards a spark plug within the combustion chamber, whereby substantially all intake gasses passing through the intake port and into the combustion chamber are at least partially deflected unidirectionally by the fin toward the direction of the spark plug opening.

11. An intake port according to claim 10 wherein the fin has one end disposed over the center of the second opening and the other end adjacent to edge of the second opening.

12. An intake port according to claim 10 wherein the fin has a longitudinal axis that is offset from the spark plug opening.

13. An intake port according to claim 12 wherein the fin longitudinal axis is offset from the spark plug opening by plus or minus 15 degrees.

14. A combustion chamber for an internal combustion engine comprising:
   a combustion chamber top surface having intake, exhaust and spark plug openings;
   a recessed portion in the combustion chamber top surface, the edge of the recessed portion being disposed generally parallel to a line bisecting the combustion chamber top surface between the intake and exhaust openings, said edge being disposed in a direction generally along a line leading toward the spark plug opening, whereby substantially all intake gasses are at least partially deflected unidirectionally by said edge toward the spark plug opening.

15. A combustion chamber according to claim 14 wherein the recessed portion edge is disposed partially between the intake and exhaust openings.

16. A combustion chamber according to claim 14 wherein the recessed portion edge is curved.

17. A combustion chamber according to claim 14 wherein the recessed portion edge has one end adjacent to the edge of the combustion chamber top surface and the other end is disposed at a point between the intake and exhaust openings.

18. A combustion chamber according to claim 14 wherein said combustion chamber top surface is generally flat.

19. A cylinder head for an internal combustion engine comprising:
   a flat cylinder head bottom surface adapted to be mounted adjacent to the top surface of an engine block;
   a generally circular portion recessed from the cylinder head bottom surface, the recessed portion forming the top surface of a combustion chamber;
   intake and exhaust openings in the top surface of the combustion chamber;
   intake port disposed within the cylinder head having a first open end for receiving an intake charge, and including a second opening forming the intake opening in the top surface of the combustion chamber;
   a spark plug opening on the top surface of the combustion chamber;
   an elongated fin protruding downwardly from the upper surface of the intake port above the intake opening, said fin being disposed such that the longitudinal axis of the fin is directed generally in a direction towards the spark plug opening, whereby intake gasses passing through the intake port and into the combustion chamber are partially deflected toward the direction of the spark plug opening by the fin; and
   a recessed portion in the combustion chamber top surface, the edge of the recessed portion being disposed partially between the intake and exhaust openings and generally perpendicular to the longitudinal axis of the intake port and disposed in a direction generally along a line leading toward the spark plug opening, whereby intake gasses are partially deflected toward the spark plug opening by the edge of the recessed portion.

20. A cylinder head according to claim 19 wherein the recessed portion edge has one end adjacent to the edge of the combustion chamber top surface and the other end is disposed at a point between the intake and exhaust openings.

21. A cylinder head for an internal combustion engine comprising:
   a flat cylinder head bottom surface adapted to be mounted adjacent to the top surface of an engine block;
   a generally circular portion recessed from the cylinder head bottom surface, the recessed portion forming the top surface of a combustion chamber;
   intake and exhaust openings in the top surface of the combustion chamber;
   intake port disposed within the cylinder head having a first open end for receiving an intake charge, and including a second opening forming the intake opening in the top surface of the combustion chamber;
   an elongated fin protruding downwardly from the upper surface of the intake port above the intake opening, said fin having one end disposed over the center of the intake opening and the other end adjacent to an edge of the intake opening;
   a spark plug opening on the top surface of the combustion chamber; and
   said fin being disposed such that the longitudinal axis of the fin is directed generally in a direction towards the spark plug opening, whereby intake gasses passing through the intake port and into the combustion chamber are partially deflected toward the direction of the spark plug opening by the fin.

22. An intake port for an intake combustion engine comprising:
   intake port disposed within the cylinder head having a first open end for receiving an intake charge, and having a second opening forming the intake opening in the top surface of a combustion chamber;
   an elongated fin protruding downwardly from an upper surface of the intake port above the second opening, wherein the fin has one end disposed over the center of the second opening and the other end adjacent to an edge of the second opening;
   said fin being disposed such that the longitudinal axis of the fin is directed generally in a direction towards a spark plug within the combustion chamber, whereby intake gasses passing through the intake port and into the combustion chamber are partially deflected toward the direction of the spark plug opening by the fin.

23. A combustion chamber for an internal combustion engine comprising:

a combustion chamber top surface having intake, exhaust and spark plug openings;

a recessed portion in the combustion chamber top surface, the edge of the recessed portion being disposed generally parallel to a line bisecting the combustion chamber top surface between the intake and exhaust openings, said edge being disposed partially between the intake and exhaust openings in a direction generally along a line leading toward the spark plug opening, whereby intake gasses are partially deflected toward the spark plug opening by the edge of the recessed portion.

24. A combustion chamber for an internal combustion engine comprising:

a combustion chamber top surface having intake, exhaust and spark plug openings;

a recessed portion in the combustion chamber top surface, the edge of the recessed portion being disposed generally parallel to a line bisecting the combustion chamber top surface between the intake and exhaust openings, said edge being disposed in a direction generally along a line leading toward the spark plug opening and having one end adjacent to the edge of the combustion chamber top surface and the other end disposed at a point between the intake and exhaust openings, whereby intake gasses are partially deflected toward the spark plug opening by the edge of the recessed portion.

\* \* \* \* \*